United States Patent [19]
Satran et al.

[11] Patent Number: 6,120,219
[45] Date of Patent: Sep. 19, 2000

[54] CUTTING INSERT AND A CUTTING TOOL ASSEMBLY

[75] Inventors: Amir Satran, Kfar Vradim; Rafael Margulis, Karmiel, both of Israel

[73] Assignee: Iscar, Ltd., Migdal Tefen, Israel

[21] Appl. No.: 09/266,848

[22] Filed: Mar. 12, 1999

[30] Foreign Application Priority Data

Apr. 29, 1998 [IL] Israel ......................................... 124281

[51] Int. Cl.$^7$ ...................................................... B23B 27/16
[52] U.S. Cl. ............................ 407/113; 407/114; 407/115
[58] Field of Search ..................... 407/113, 114, 407/115, 116, 30, 33, 34, 53

[56] References Cited

U.S. PATENT DOCUMENTS

| | | | |
|---|---|---|---|
| 3,762,005 | 10/1973 | Erkfritz . | |
| 5,071,291 | 12/1991 | Kaminski | 407/114 X |
| 5,209,611 | 5/1993 | Drescher | 407/48 |
| 5,226,761 | 7/1993 | Satran et al. | 407/114 |
| 5,382,118 | 1/1995 | Satran et al. | 407/42 |
| 5,695,303 | 12/1997 | Boianjiu | 407/114 |
| 5,791,833 | 8/1998 | Niebauer | 407/114 |
| 5,876,154 | 3/1999 | Enderle | 407/114 |
| 5,921,723 | 7/1999 | Satran et al. | 407/114 |
| 5,947,650 | 9/1999 | Satran et al. | 407/113 |

FOREIGN PATENT DOCUMENTS

| | | |
|---|---|---|
| 0 457 488 | 5/1991 | European Pat. Off. . |
| 2 234 854 | 2/1973 | Germany . |
| 195 16 946 A1 | 11/1996 | Germany . |
| WO 98/07540 | 2/1998 | WIPO . |
| WO 98/19815 | 5/1998 | WIPO . |

*Primary Examiner*—Henry W. H. Tsai
*Attorney, Agent, or Firm*—Pennie & Edmonds LLP

[57] ABSTRACT

An exchangeable cutting insert comprises a front cutting portion having an operative front surface with two lower corners and at least one upper corner, and a trailing mounting portion extending rearwardly therefrom. The front cutting portion is formed with a major cutting edge extending between the two lower corners and a minor side edge extending between one of the lower corners and said upper corner. The minor side edge is substantially perpendicular to the major cutting edge. The major cutting edge has two trailing extremities associated with the lower corners, and having a leading extremity which protrudes outwardly and is raised upwardly relative to the trailing extremities.

21 Claims, 4 Drawing Sheets

CUTTING INSERT AND A CUTTING TOOL ASSEMBLY

FIELD OF THE INVENTION

The present invention refers to a cutting insert of the type having a front cutting portion associated with an operative cutting edge and a trailing mounting portion for mounting the insert in a cutting tool.

BACKGROUND OF THE INVENTION

The present invention generally refers to a cutting insert adapted for its mounting at a front face of a rotary cutting tool in such a manner that a clamping screw bore with which the insert is fastened to the cutting tool is directed substantially along a longitudinal axis of rotation of the cutting tool, and an operative cutting edge of the cutting insert lies substantially in a plane perpendicular to this axis, for use in such cutting operations as plunging, end milling, and the like.

A cutting insert of the above kind is described in the Applicants'co-pending Israel Patent Application No. 119557. The cutting insert is of a triangular basic shape and has upper, lower and side surfaces, the lower surface being bound by three indexable cutting edges each of which, at least partially, protrudes outwardly relative to adjacent insert corners towards an outermost extremity of the cutting edge. In addition, each cutting edge lies in a plane which passes through these corners and is inclined towards the upper surface of the cutting insert. The cutting insert is adapted for mounting on a cutting tool in such a manner that its lower surface is slightly inclined relative to a longitudinal axis of the cutting tool so as to bring the plane in which its operative cutting edge lies in a position substantially perpendicular to this axis.

When a cutting insert having the above geometry of its cutting edge is mounted in a cutting tool in the above specific manner, the insert cutting edge is provided with an appropriate relief from a face surface of a workpiece and its entire cutting edge lies in a plane parallel to this face surface, whereby a high planarity of the latter can be achieved. In addition, notwithstanding the planar geometry of the cutting edge, it can still carry out its piloting function since the central outermost point thereof is disposed ahead of the remainder of the cutting edge.

It is the object of the present invention to provide a new cutting insert having geometry of its front cutting portion specifically useful for such cutting operations as plunging at high removal rates.

SUMMARY OF THE INVENTION

In accordance with the present invention, there is provided an exchangeable cutting insert comprising:
- a front cutting portion having an operative front surface with two lower corners and at least one upper corner, and a trailing mounting portion extending rearwardly therefrom;
- a major cutting edge extending between said two lower corners of the front cutting portion;
- a minor side edge extending between one of said lower corners and said upper corner, said minor side edge being substantially perpendicular to said major cutting edge;
- said major cutting edge having two trailing extremities associated with said lower corners, and having a leading extremity which protrudes outwardly and is raised upwardly relative to said trailing extremities.

Preferably, the trailing mounting portion of the cutting insert is formed with a clamping screw bore having an axis substantially co-directional with said side edge of the operative front surface.

Preferably, the major cutting edge lies in an imaginary plane passing through the leading and trailing extremities thereof.

Preferably, the cutting insert is indexable and has a pair of identical upper and lower major cutting edges and a pair of identical minor side cutting edges substantially perpendicular thereto, the upper and lower major cutting edges extending between their respective upper and lower trailing extremities and having respective upper and lower leading extremities the distance between which is smaller than the distance between the upper and lower trailing extremities.

Preferably, the operative front surface of the insert is formed with chip rake surfaces adjacent each of the upper, lower and side cutting edges and with a chip breaking protrusion disposed centrally at said operative side surface, the chip rake surfaces extending inwardly from each of said upper, lower and side cutting edges and merging with respective upper, lower and side chip breaking walls of the chip breaking protrusion. It is preferable that the chip breaking protrusion protrudes outwardly relative to said upper, lower and side cutting edges.

Preferably, the trailing mounting portion is of a prismoidal shape and has upper and lower walls extending from said upper and lower cutting edges of the front cutting portion and merging therewith via relief surfaces of the upper and lower cutting edges, and side walls extending from said side edges of the front cutting portion and merging therewith via relief surfaces of the side cutting edges, said upper and lower walls and said side walls converging towards each other in a rear direction of the cutting insert. Preferably, the relief surfaces of the cutting edges extend therefrom in an inward direction of the cutting insert.

With the specific geometry of the major cutting edges which is particularly advantageous for plunging operations, combined with minor side cutting edges oriented substantially perpendicularly to the major cutting edges, the corners of the front cutting portion are essentially strengthened, which enables the use of the cutting insert for cutting operations at high removal rates. Furthermore, when the minor side edges are used as operative cutting edges, for example, for cutting a face surface of a workpiece, the geometry of the major cutting edges is surprisingly useful for the provision of the cutting insert with an appropriate clearance from a side wall of the workpiece. Moreover, the chip breaking protrusion formed at the operative front surface of the cutting insert of the present invention may essentially facilitate efficient plunging at high removal rates.

An additional advantage of the geometry of the cutting insert of the present invention is that it is specifically suitable for net-shape technology.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE DRAWINGS

FIGS. 1 to 5 illustrate an exchangeable cutting insert 1 according to a preferred embodiment of the present invention. The cutting insert 1 is double-sided and comprises a front cutting portion 2 with an operative front surface 3 and a trailing mounting portion 4 formed integrally therewith and extending from the front cutting portion 2 in a rear direction of the cutting insert 1.

Figure 1:
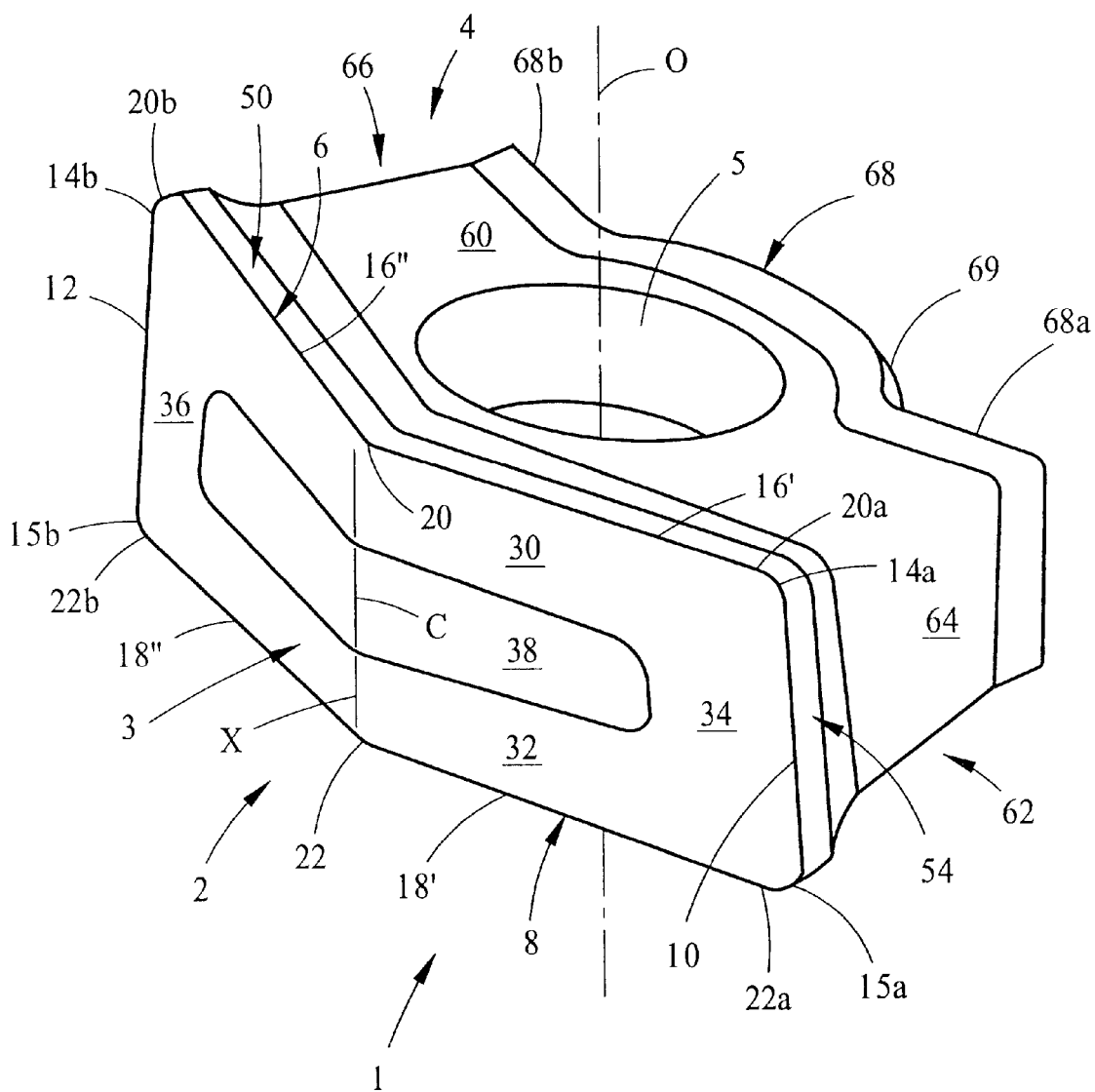
FIG. 1 is a perspective view of a cutting insert according to the present invention.
Figure 2:
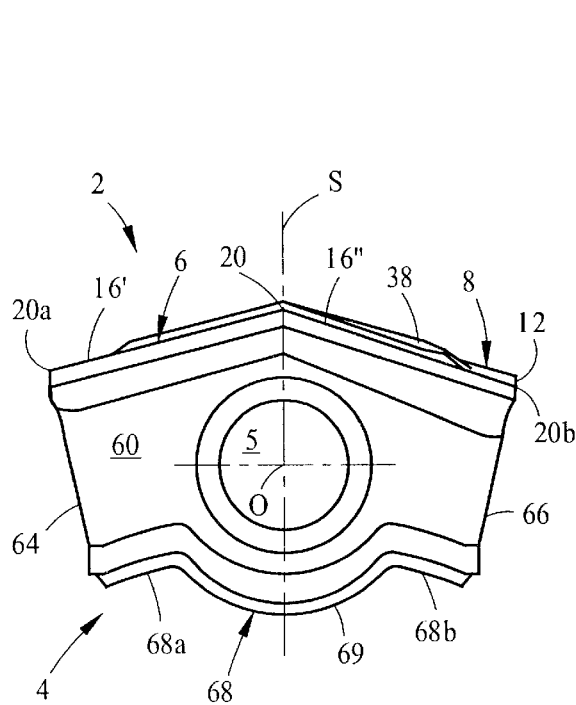
FIG. 2 is a plan view of the cutting insert shown in FIG. 1.
Figure 4:
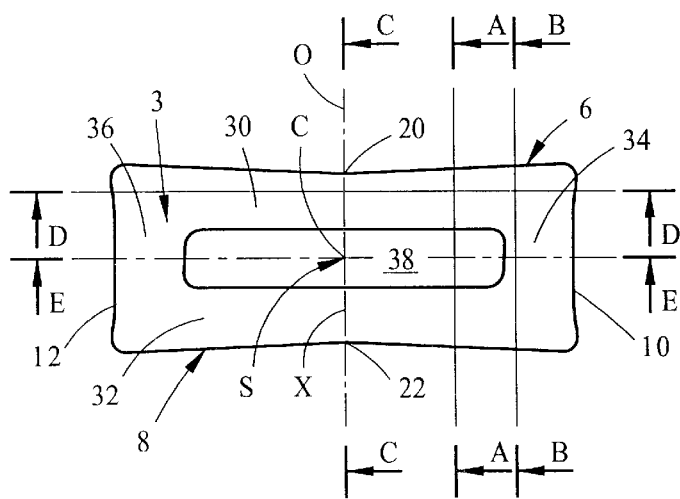
FIG. 4 is a front view of the cutting insert shown in FIG. 1.
Figure 5:
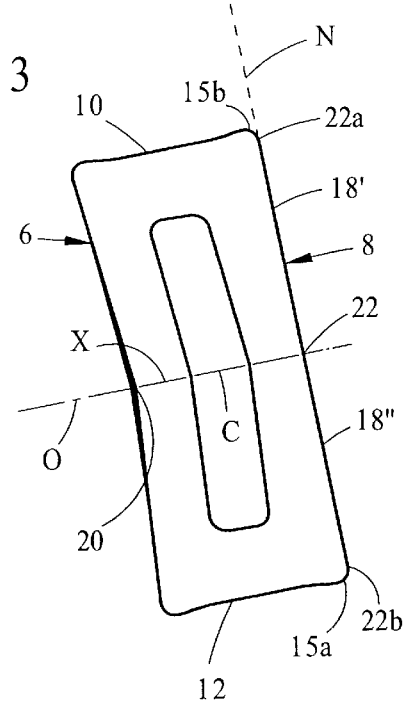
FIG. 5 is a front view of the cutting insert shown in FIG. 1 as seen in the direction V in FIG. 3.

As seen in FIGS. 1, 2 and 4, the operative front surface 3 of the front cutting portion 2 is bound by upper and lower major cutting edges 6 and 8 and by minor side cutting edges 10 and 12 extending therebetween and meeting therewith at upper corner edges 14a and 14b and lower corner edges 15a and 15b, which are preferably rounded. The minor side cutting edges 10 and 12 are substantially perpendicular to the upper and lower major cutting edges 6 and 8.

The trailing mounting portion 4 of the cutting insert 1 is formed with a clamping screw bore 5 having an axis O substantially co-directional with the minor side cutting edges 10 and 12, for mounting the cutting insert on a cutting tool.

As seen in FIGS. 1 and 2, each of the upper and lower major cutting edges 6 and 8 comprises, respectively, two component cutting edges 16', 16" and 18', 18", which extend towards respective upper and lower leading extremities 20 and 22 from respective upper and lower trailing extremities 20a, 20b and 22a, 22b thereof associated with the respective upper and lower corner edges 14a, 14b and 15a, 15b and constituting, respectively, the uppermost and lowermost points of the front cutting portion 2.

Figure 3:
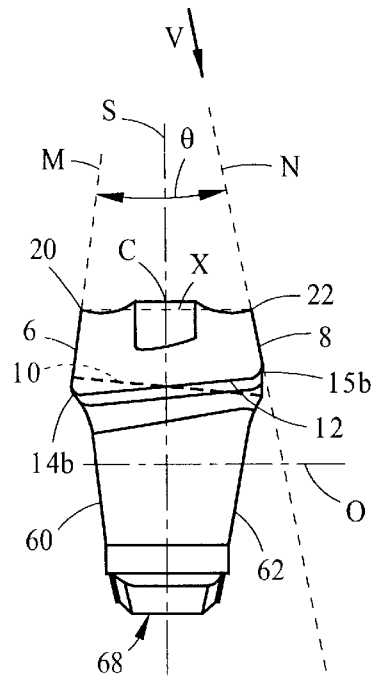
FIG. 3 is a side view of the cutting insert shown in FIG. 1.

As shown in FIG. 3, the upper and lower major cutting edges 6 and 8 lie in respective imaginary planes M and N which extend so as to define between them a relatively small acute angle θ. As seen in FIG. 3, planes M and N converge in a direction away from the trailing mounting portion 4. By virtue of this geometry, the distance between the upper and lower leading extremities 20 and 22, respectively, is smaller than the distance between each pair of the upper and lower trailing extremities 20a–22a, 20b–22b, which is seen from FIGS. 3 and 4.

As seen in FIGS. 1, 3, 4 and 5, the front cutting portion 2 has a central line X which passes through the leading extremities 20 and 22 of the respective upper and lower major cutting edges 6 and 8, and which is parallel to the axis O of the clamping screw bore 5. As seen in FIGS. 2 and 3, a line S passing through a central point C of the central line X and intersecting the axis O of the clamping screw bore 5 perpendicularly thereto, constitutes an axis of 180° symmetry of the cutting insert 1 around which it is indexable.

As seen in FIGS. 2 and 3, the minor side cutting edges 10 and 12 are inclined in opposite senses relative to the central line X of the front cutting portion 2.

As seen in FIGS. 1 and 4 and specifically shown in FIGS. 6a, 6b, 6c, 6d and 6e, the operative front surface 3 of the cutting insert 1 is formed with chip rake surfaces 30, 32, 34 and 36 disposed adjacent and extending inwardly from the respective upper, lower and side cutting edges 6, 8, 10 and 12.

Figure 6A:
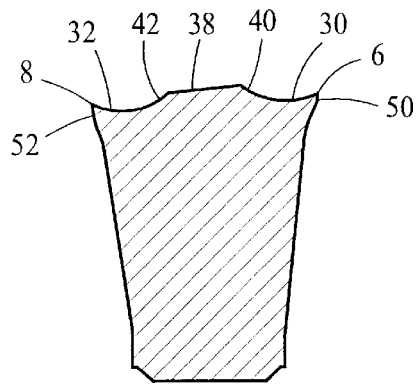
FIGS. 6a, 6b, 6c, 6d and 6e are cross-sectional views of the cutting insert shown in FIG. 1, taken along the respective lines A—A, B—B, C—C, D—D and E—E in FIG. 4.
Figure 6B:
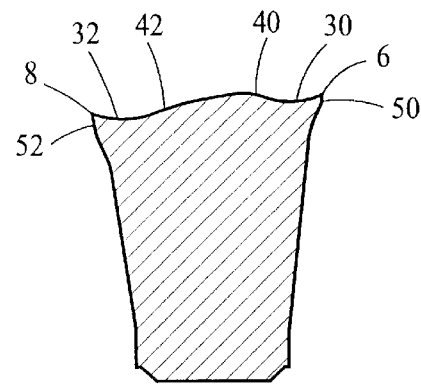
Figure 6E:
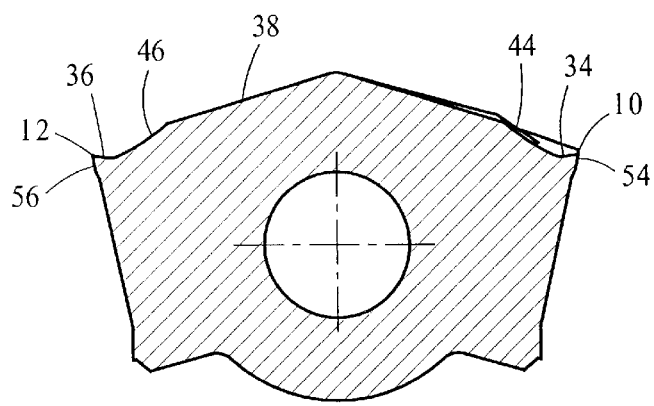
Figure 6C:
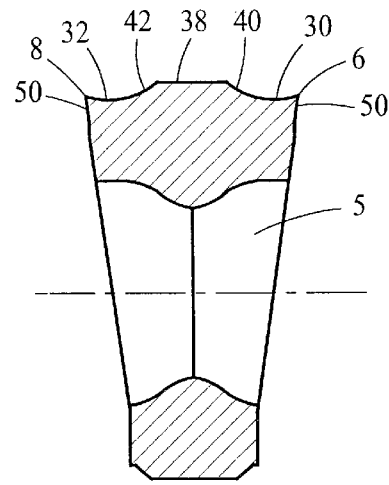
Figure 6D:
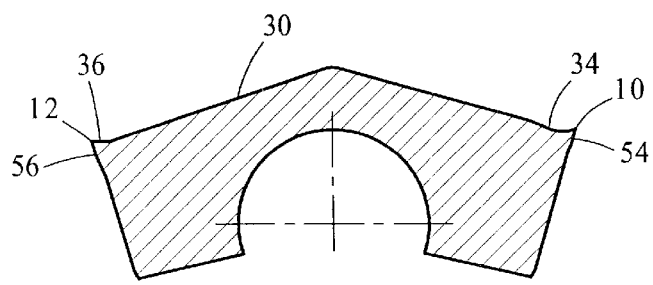

The operative front surface 3 is further formed with a centrally disposed chip bearing protrusion 38 which, as seen in FIGS. 6a, 6b and 6e, has an upper chip breaking wall 40 merging with the upper chip rake surface 30, a lower chip breaking wall 42 merging with the lower chip rake surface 32 and side chip breaking walls 44 and 46 merging with respective side chip rake surfaces 344 and 36. As seen in FIGS. 2 and 3, the chip breaking protrusion 38 protrudes outwardly relative to the upper, lower and side cutting edges 6, 8, 10 and 12.

As seen in FIGS. 1 and 6a to 6e, the front cutting portion 2 is further formed with upper, lower and side relief surfaces 50, 52, 54 and 56 extending from the respective upper, lower and side cutting edges 6, 8, 10 and 12 and merging with the trailing mounting portion 4 of the cutting insert 1.

As shown in FIGS. 6a to 6e, the respective upper, lower and side chip rake surfaces 30, 32, 34 and 36 extend inwardly from the respective cutting edges 6, 8, 10 and 12 at angles which vary along the length of these cutting edges so as to provide the cutting insert 1, when mounted in a cutting tool, with appropriate effective positive chip rake angles. Similarly, the upper, lower and side relief surfaces 50, 52, 54 and 56 are oriented so as to provide the cutting insert with appropriate effective relief angles.

Reverting to FIG. 1, the trailing mounting portion 4 of the cutting insert 1 is of a prismoidal shape and has, respectively, upper and lower walls 60 and 62, extending inwardly and rearwardly from the respective upper and lower relief surfaces 50 and 52 of the front cutting portion 2, side walls 64 and 66 extending inwardly and rearwardly from the respective side relief surfaces 54 and 56 of the front cutting portion 2, and a rear abutment wall 68 extending therebetween.

As seen in FIG. 3, the upper and lower walls 60 and 62 converge towards the rear abutment wall 68 of the trailing mounting portion 4 of the cutting insert 1, and so do the side walls 64 and 66 which are seen in FIG. 2. It is also seen in FIG. 2 that the rear abutment wall 68 of the trailing mounting portion 4 comprises two lateral abutment surfaces 68a and 68b and an arcuate central abutment surface 69. The lateral abutment surfaces 68a and 68b extend inwardly from the respective side walls 64 and 66 of the trailing mounting portion 4 and define therebetween an angle which is substantially equal to an angle formed between the component cutting edges 16' and 16" of the upper cutting edge 16 and between the component cutting edges 18' and 18" of the lower cutting edge 18.

Figure 7:
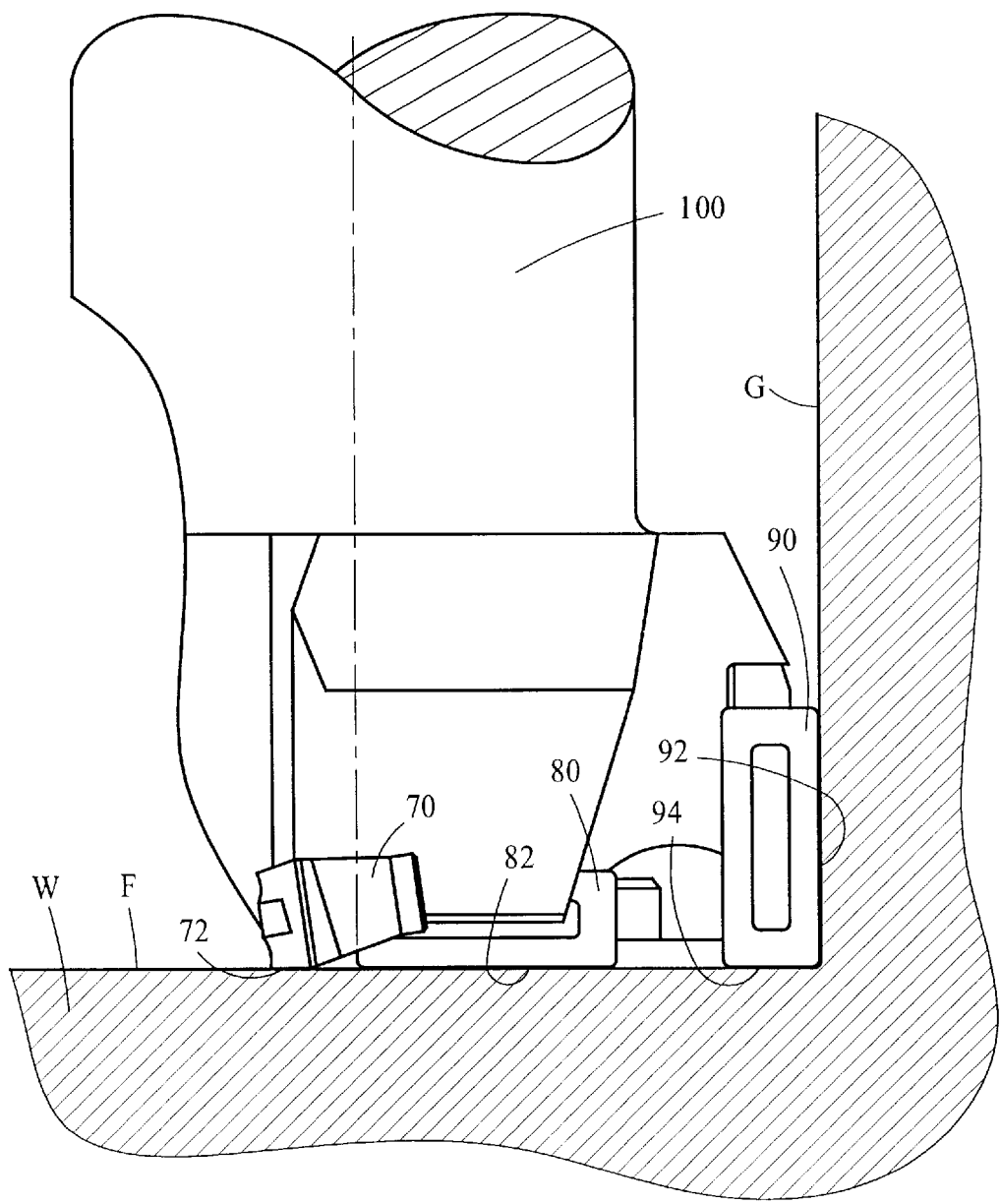
FIG. 7 is a partial side view of a cutting tool equipped with cutting inserts according to the present invention, during a plunging operation.

FIG. 7 shows cutting inserts 70, 80 and 90 mounted on a cutting tool 100 for plunging a workpiece W. As seen, the cutting inserts 70 and 80 are mounted so that their respective lower major cutting edges 72 and 82 are disposed in an operative position to cut a face surface F of the workpiece W. In the cutting insert 90, a major cutting edge 92 is not operative whilst a minor side edge 94 is in its operative position. It should be pointed out that the specific geometry of the major cutting edge 92, as described above with respect to the cutting insert 1, is useful for the provision of this cutting edge with an appropriate clearance from a side wall G of the workpiece adjacent the cutting insert's operative cutting corner, whereby the wear of the cutting edge may be essentially reduced. However, this clearance, being extremely small, cannot be seen in FIG. 7.

The cutting insert may have alternative designs not described above and not shown in the drawings. Thus, for example, the major cutting edges may consist of more than two components, which components may be of a straight or curved shape. The minor cutting edges need not necessarily be inclined and may be curved or have any other appropriate design. The trailing mounting portion may be different from that described above and, for example, its walls do not have necessarily to converge inwardly from the front cutting portion of the cutting insert. The cutting insert may be used in cutting tools designed for cutting operations other than plunging and its clamping in the cutting tools may be performed in any manner appropriate therefore.

THE LIST OF REFERENCE NUMERALS

| | |
|---|---|
| 1 | cutting insert |
| 2 | front cutting portion |
| 3 | operative front surface |
| 4 | trailing mounting portion |
| 5 | clamping screw bore |
| 6, 8 | upper and lower major cutting edges |
| 10, 12 | minor side cutting edges |
| 14a, 14b | upper corner edges |
| 15a, 15b | lower corner edges |
| 16', 16" | component cutting edges of the upper major cutting edge 6 |
| 18', 18" | component cutting edges of the lower major cutting edge 8 |
| 20, 20a, 20b | leading and trailing extremities of the upper major cutting edge 6 |
| 22, 22a, 22b | leading and trailing extremities of the lower major cutting edge 8 |
| 30, 32, 34, 36 | chip rake surfaces |
| 38 | chip breaking protrusion |
| 40, 42, 44, 46 | chip breaking walls |
| 50, 52, 54, 56 | relief surfaces |
| 60, 62, 64, 66 | upper, lower and side walls of the trailing mounting portion 4 |
| 68 | rear abutment wall |
| 68a, 68b | lateral abutment surfaces of the rear abutment wall 68 |
| 69 | central abutment surface of the rear abutment wall 68 |
| 70, 80, 90 | cutting inserts mounted in a cutting tool |
| 72, 82 | operative cutting edges of the respective cutting inserts 70, 80 |
| 92 | inoperative major cutting edge of the cutting insert 90 |
| 94 | operative minor cutting edge of the cutting insert 90 |
| C | central point of the operative front surface |
| F | front surface of a workpiece W |
| G | side surface of a workpiece W |
| M, N | imaginary planes of the respective cutting edges 6 and 8 |
| S | axis of symmetry |
| X | central line |
| W | workpiece |
| θ | angle between the planes M and N |

What is claimed is:

1. An exchangeable cutting insert comprising:
a front cutting portion having an operative front surface with two lower corners and at least one upper corner, and a trailing mounting portion extending rearwardly therefrom;
a major cutting edge extending between said two lower corners of the front cutting portion;
a minor side edge extending between one of said lower corners and said at least one upper corner, said minor side edge being substantially perpendicular to said major cutting edge and being formed as a cutting edge having a chip rake surface;
said major cutting edge having two trailing extremities associated with said lower corners, and having a leading extremity which protrudes outwardly and is raised upwardly relative to said trailing extremities.

2. A cutting insert according to claim 1, wherein said trailing mounting portion is formed with a clamping screw bore having an axis substantially parallel to said side edge of the operative front surface.

3. A cutting insert according to claim 1, wherein said major cutting edge lies in an imaginary plane passing through the leading and trailing extremities thereof.

4. A cutting insert according to claim 1, wherein the cutting insert is indexable and has a pair of identical upper and lower major cutting edges and a pair of identical minor side cutting edges substantially perpendicular thereto, the upper and lower major cutting edges extending between their respective upper and lower trailing extremities and having respective upper and lower leading extremities the distance between which is smaller than the distance between the upper and lower trailing extremities.

5. A cutting insert according to claim 4, wherein said front cutting portion has a central line connecting said upper and lower leading extremities, and said trailing mounting portion is formed with a clamping screw bore having an axis substantially parallel to said central line, the insert having an axis of 180° symmetry which passes through a central point of said central line and intersects the axis of said clamping screw bore perpendicularly thereto.

6. A cutting insert according to claim 4, wherein each of said upper and lower major cutting edges has two component cutting edges extending from the respective upper and lower trailing extremities towards the leading extremity thereof.

7. A cutting insert according to claim 4, wherein the operative front surface of the insert is formed with chip rake surfaces adjacent each of the upper, lower and side cutting edges, extending inwardly from each of said upper, lower and side cutting edges.

8. A cutting insert according to claim 4, wherein said operative front surface is formed with a centrally disposed chip breaking protrusion.

9. A cutting tool assembly comprising a tool holder with a longitudinal axis perpendicular to a face of a workpiece being machined, and an exchangeable cutting insert mounted at a leading end thereof;
said cutting insert comprising a front cutting portion having an operative front surface with two lower corners and at least one upper corner, and a trailing mounting portion extending rearwardly therefrom; a major cutting edge extending between said two lower corners of the front cutting portion; a minor side edge extending between one of said lower corners and said at least one upper corner, said minor side edge being substantially perpendicular to said major cutting edge and being formed as a cutting edge having a chip rake surface; said major cutting edge having two trailing extremities associated with said lower corners, and having a leading extremity which protrudes outwardly and is raised upwardly relative to said trailing extremities;
said insert being mounted in said tool holder in such a manner that one of its edges is located in a plane perpendicular to said longitudinal axis of the tool holder.

10. A cutting tool assembly according to claim 9, wherein said major cutting edge of the cutting insert lies in the plane perpendicular to said longitudinal axis of the tool holder.

11. A cutting assembly according to claim 9, wherein said minor side edge lies in the plane perpendicular to said longitudinal axis of the tool holder and constitutes an operative cutting edge of the cutting insert.

12. A cutting insert comprising:
   a front cutting portion having an operative front surface with two lower corners and at least one upper corner, and a trailing mounting portion extending rearwardly therefrom;
   a major cutting edge extending between said two lower corners of the front cutting portion;
   a minor side edge extending between one of said lower corners and said at least one upper corner, said minor side edge being directed in an upward direction of the cutting insert, said minor side edge also being substantially perpendicular to said major cutting edge and being formed as a cutting edge having a chip rake surface;
   said major cutting edge having two trailing extremities associated with said lower corners, and having a leading extremity which protrudes outwardly relative to said trailing extremities in a direction away from the trailing mounting portion, said leading extremity being raised from said trailing extremities in said upward direction of the cutting insert.

13. The cutting insert according to claim 12, wherein the cutting insert is indexable and has a pair of identical upper and lower major cutting edges and a pair of identical minor side cutting edges substantially perpendicular thereto, the upper and lower major cutting edges extending between their respective upper and lower trailing extremities and having respective upper and lower leading extremities the distance between which is smaller than the distance between the upper and lower trailing extremities.

14. A cutting insert according to claim 13, wherein the operative front surface of the insert is formed with chip rake surfaces adjacent each of the upper, lower and side cutting edges, extending inwardly from each of said upper, lower and side cutting edges.

15. A cutting insert according to claim 13, wherein said operative front surface is formed with a centrally disposed chip breaking protrusion.

16. A cutting tool assembly comprising a tool holder with a longitudinal axis perpendicular to a face of a workpiece being machined, and an exchangeable cutting insert mounted at a leading end thereof;
   said cutting insert comprising
      a front cutting portion having an operative front surface with two lower corners and at least one upper corner, and a trailing mounting portion extending rearwardly therefrom;
      a major cutting edge extending between said two lower corners of the front cutting portion;
      a minor side edge extending between one of said lower corners and said at least one upper corner and directed in an upward direction of the cutting insert, said minor side edge being substantially perpendicular to said major cutting edge and being formed as a cutting edge having a chip rake surface;
      said major cutting edge having two trailing extremities associated with said lower corners, and having a leading extremity which protrudes outwardly relative to said trailing extremities in a direction away from the trailing mounting portion, and is raised from said trailing extremities in said upward direction of the cutting insert,
   said insert being mounted in said tool holder in such a manner that one of its edges is located in a plane perpendicular to said longitudinal axis of the tool holder.

17. A cutting tool assembly according to claim 16, wherein said major cutting edge of the cutting insert lies in a plane perpendicular to said longitudinal axis of the tool holder.

18. A cutting tool assembly according to claim 16, wherein said minor side edge lies in a plane perpendicular to said longitudinal axis of the tool holder and constitutes an operative cutting edge of the cutting insert.

19. A cutting insert comprising:
   a front cutting portion having an operative front surface, in a front view of the insert, the operative front surface being provided with first and second lower corners and first and second upper corners, and a trailing mounting portion extending rearwardly therefrom;
   a lower major cutting edge extending between said first and second lower corners and an upper major cutting edge extending between said first and second upper corners;
   a first minor side edge extending between said first lower corner and said first upper corner, and a second minor side edge extending between said second lower corner and said second upper corner, the first and second minor side edges being formed as cutting edges, each having a chip rake surface;
   said lower and upper major cutting edges each having a pair of trailing extremities associated with corresponding lower and upper corners, respectively, said lower and upper major cutting edges also having respective lower and upper leading extremities,
   said lower leading extremity protruding outwardly from said lower trailing extremities in a direction away from said trailing mounting portion, and being raised upwardly relative to said lower trailing extremities in said front view of the insert's operative front surface,
   said upper leading extremity protruding outwardly from said upper trailing extremities in a direction away from said trailing mounting portion, and being lowered downwardly relative to said upper trailing extremities in said front view of the insert's operative front surface.

20. A cutting insert according to claim 19, wherein each of said major cutting edges is two-dimensional and lies in respective first and second planes.

21. An exchangeable cutting insert according to claim 20, wherein said first and second planes form an acute angle therebetween and converge in a direction away from said trailing mounting portion.

* * * * *